(12) United States Patent
Yousef (10) Patent No.: US 7,751,309 B2
(45) Date of Patent: Jul. 6, 2010

(54) WIC AND LIC ESTIMATION IN MEDIAFLO SYSTEMS

(75) Inventor: Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 306 days.

(21) Appl. No.: 12/062,758

(22) Filed: Apr. 4, 2008

(65) Prior Publication Data

US 2009/0252027 A1 Oct. 8, 2009

(51) Int. Cl.
*H04J 11/00* (2006.01)
(52) U.S. Cl. ..................................... 370/210
(58) Field of Classification Search .................. 370/210, 370/208, 209
See application file for complete search history.

(56) References Cited

U.S. PATENT DOCUMENTS 6,522,650 B1 * 2/2003 Yonge et al. ................ 370/390

2005/0002327 A1 * 1/2005 Li .............................. 370/210

* cited by examiner

*Primary Examiner*—Derrick Ferris
*Assistant Examiner*—Mohammad Anwar
(74) *Attorney, Agent, or Firm*—Rahman LLC (57) ABSTRACT

An apparatus and method for WIC/LIC estimation without channel mode construction in a MediaFLO™ system comprising a receiver, a transmitter and transmission channel, wherein the method comprises receiving a signal comprising a MediaFLO™ mobile multimedia multicast system superframe comprising WIC/LIC symbols; setting a first sparseness index value of the digital signal to zero; setting a local copy WIC/LIC number of the digital signal to one; generating a local copy of all possible values of the WIC/LIC symbols corresponding to a WID/LID value from zero to fifteen; dividing the received WIC/LIC symbol values by a local copy WIC/LIC value corresponding to WIC/LIC number one; performing an IFFT of all the possible values of the WIC and LIC symbols; calculating a second sparseness index value of the IFFT of sixteen possible values of the WIC/LIC symbols; and extracting a WIC/LIC symbol from the digital signal corresponding to the second sparseness index.

20 Claims, 9 Drawing Sheets

WIC AND LIC ESTIMATION IN MEDIAFLO SYSTEMS

BACKGROUND

1. Technical Field

The embodiments herein generally relate to communication networks, and, more particularly, to Orthogonal Frequency Division Multiplexing (OFDM) symbols of multimedia data transmission based on the MediaFLO™ (Forward Link Only) mobile multimedia multicast system.

2. Description of the Related Art

In recent years, the wireless industry has seen explosive growth in device capability, especially in relation to mobile devices, such as cell phones, handhelds, gaming consoles, etc. Ever-increasing demand for computing power, memory, and high-end graphic functionalities has accelerated the development of new and exciting wireless services. In the last few years, multiple technologies have been proposed to address delivery of streaming multimedia to mobile devices.

Multimedia communications provide a rich and immediate environment of image, graphics, sound, text and interaction through a range of technologies. An example of multimedia communication is streaming multimedia which is primarily a delivery of continuous synchronized media data. The streaming multimedia is constantly received by, and displayed to an end user while it is being delivered by a provider. Multiple technologies such as Integrated Services Digital Broadcasting-Terrestrial (ISDB-T), Terrestrial-Digital Multimedia Broadcasting (T-DMB), Satellite-Digital Multimedia Broadcasting (S-DMB), Digital Video Broadcasting-Handheld (DVB-H), and FLO (Forward Link Only) are used to address the delivery of streaming multimedia to mobile devices. These technologies have typically leveraged upon either third generation cellular/PCS, or digital terrestrial TV broadcast technologies.

For delivering unprecedented volumes of high-quality, streaming or clipped, audio and video multimedia to wireless subscribers, an air interface has been developed based on FLO technology for MediaFLO™ mobile multimedia multicast system available from Qualcomm, Inc., California, USA. MediaFLO™ or media forward link only is a combination of the media distribution system and the FLO technology. The FLO technology is the ability to deliver a rich variety of content choice to consumers while efficiently utilizing spectrum as well as effectively managing capital and operating expenses for service providers. The details of the Media-FLO™ mobile multimedia multicast system are available in Chari, M. et al., "FLO Physical Layer: An Overview," IEEE Transactions on Broadcasting, Vol. 53, No. 1, March 2007, the contents of which, in its entirety, is herein incorporated by reference.

FLO technology was designed specifically for the efficient and economical distribution of the same multimedia content to millions of wireless subscribers simultaneously. Also, the FLO technology was designed from the ground up to be a multicasting network, which is overlaid upon a cellular network. It does not need to support any backward compatibility constraints. Thus, both the network infrastructure and the receiver devices are separate from those for the cellular/PCS network. Moreover, as the name suggests, the technology relies on the use of a forward link (network to device) only.

FLO enables reducing the cost of delivering such content and enhancing the user experience, allowing consumers to "surf" channels of content on the same mobile handsets they use for traditional cellular voice and data services.

MediaFLO™ technology can provide robust mobile performance and high capacity without compromising power consumption. The technology also reduces the network cost of delivering multimedia content by dramatically decreasing the number of transmitters needed to be deployed. In addition, MediaFLO™ technology-based multimedia multicasting complements wireless operators' cellular network data and voice services, delivering content to the same cellular handsets used on 3G networks.

The MediaFLO™ wireless system has been designed to broadcast real time audio and video signals, apart from non-real time services to mobile users. The system complements existing networks and radically expands the ability to deliver desired content without impacting the voice and data services. Operators can leverage the MediaFLO™ system to increase average revenue per user (ARPU) and reduce churn by offering enhanced multimedia services. Content providers can take advantage of a new distribution channel to extend their brand to mobile users. Device manufacturers will benefit from increased demand for multimedia-enabled handsets as consumer appetite grows for the rich content provided through MediaFLO™ systems.

The MediaFLO™ service is designed to provide the user with a viewing experience similar to a television viewing experience by providing a familiar type of program-guide user interface. Users can simply select a presentation package, or grouping of programs, just as they would select a channel to subscribe to on television. Once the programs are selected and subscribed to, the user can view the available programming content at any time. In addition to viewing high quality video and audio content and IP data, the user may also have access to related interactive services, including the option to purchase a music album, ring tone, or download of a song featured in a music program. The user can also purchase access to on-demand video programming, above and beyond the content featured on the program guide.

The respective MediaFLO™ system transmission is carried out using tall and high power transmitters to ensure wide coverage in a given geographical area. Further, it is common to deploy 3-4 transmitters in most markets to ensure that the MediaFLO™ system signal reaches a significant portion of the population in a given market. During the acquisition process of a MediaFLO™ system data packet several determinations and computations are made to determine such aspects as frequency offsets for the respective wireless receiver. Given the nature of MediaFLO™ system broadcasts that support multimedia data acquisitions, efficient processing of such data and associated overhead information is paramount. For instance, when determining frequency offsets or other parameters, complex processing and determinations are required where determinations of phase and associated angles are employed to facilitate the MediaFLO™ system transmission and reception of data.

To achieve good receiver performance and high spectral efficiency of multimedia multicasting in a mobile communication environment, the FLO physical layer uses Orthogonal Frequency Division Multiplexing (ODFM) as the modulation technique. Inside an ODFM symbol, a Wide-area Identification Channel (WIC) spans one OFDM symbol and is transmitted at the first ODFM symbol index in a superframe. It follows the first Time Division Multiplexing (TDM) Pilot ODFM symbol. This is an overhead channel that is used for conveying the Wide-area Differentiator (WID) to the FLO receivers. The Local-area Identification Channel (LIC) spans one ODFM symbol and is transmitted at the second ODFM symbol index in the superframe. It follows the WIC channel ODFM symbol. This is an overhead channel that is used for conveying the Local-area Differentiator (LID) information to the FLO receivers.

The values of WID and LID constitute a part of the scrambling sequence that is used for the scrambling of both the wide and local area Overhead Information Symbols (OIS) and the data fields. Without the values of the WID and the LID, it is not possible to descramble either the OIS or the data fields.

Figure 1A:
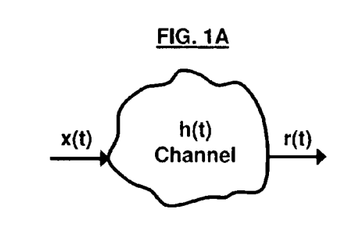
FIG. 1A is a schematic diagram illustrating a channel model of a data sequence in a wireless communication system.

Channel model is the model that describes the phenomena that affect the transmitted information along its path to the receiver. These phenomena may change transmitted frames completely. In order to avoid incorrect or incomplete reception there is an equalizing stage at the receiver that creates a model for the channel and equalizes its effect. The received data sequence, as schematically represented in FIG. 1A, can be represented by the equation r(t)=h(t)*x(t), where r(t) is the received data sequence, h(t) is the channel effect, and x(t) is the descrambled transmitted data sequence. The role of the equalizer is to estimate the channel effect h(t) continuously in order to get the actual descrambled transmitted data sequence x(t). For this purpose FDM pilots are typically needed.

The FDM pilot symbols are descrambled and sent within the OIS and data frames symbols inside the superframe. To find the values of FDM symbols, it is desirable to get the values of WID and LID, which become distorted by the channel effects. The WIC and LIC symbols do not contain FDM pilots so a channel model typically cannot be constructed for these symbols. Accordingly, there remains a need to derive WIC and LIC estimation in MediaFLO™ mobile multimedia multicast systems.

SUMMARY

In view of the foregoing, an embodiment herein provides A method of estimating a WIC and a LIC in a MediaFLO™ mobile multimedia multicast system comprising a receiver, a transmitter, and a transmission channel, and a program storage device readable by computer, tangibly embodying a program of instructions executable by the computer to perform the method of estimating a WIC and a LIC in a MediaFLO™ mobile multimedia multicast system comprising a receiver, a transmitter, and a transmission channel, wherein the method comprises receiving a wireless data signal comprising a MediaFLO™ mobile multimedia multicast system superframe comprising WIC and LIC symbols; setting a first sparseness index value of the digital signal to zero; setting a local copy WIC and LIC number of the digital signal to one; generating a local copy of all possible values of the WIC and LIC symbols corresponding to a WID and LID value from zero to fifteen; dividing the received WIC and LIC symbol values by a local copy WIC and LIC value corresponding to WIC and LIC number one; performing an Inverse Fast Fourier Transform (IFFT) of the all possible values of the WIC and LIC symbols; calculating a second sparseness index value of the IFFT of sixteen possible values of the WIC and LIC symbols; and extracting a WIC and LIC symbol from the digital signal corresponding to the second sparseness index.

The method may further comprise confirming that the second sparseness index is greater than the first sparseness index; setting the first sparseness index equal to the second sparseness index upon confirmation that the second sparseness index is greater than the first sparseness index; and confirming that the local copy WIC and LIC number equals fifteen. Additionally, the method may further comprise adding one to the local copy WIC and LIC number to generate a new local copy WIC and LIC value when the local copy WIC and LIC number does not equal fifteen; and setting the local copy WIC and LIC value equal to the new local copy WIC and LIC value.

Also, the method may further comprise using the extracted WIC and LIC symbol as an estimate of the transmission channel in a time domain. Moreover, the dividing of the received WIC and LIC symbols by the local copy WIC and LIC value preferably results in an estimate of the transmission channel in a frequency domain. Furthermore, all possible values of the WIC and LIC symbols preferably equals sixteen. The method may further comprise correcting a coarse carrier frequency offset of each of the received WIC and LIC symbols prior to performing the dividing process.

Another embodiment provides an apparatus for estimating a WIC and a LIC in a MediaFLO™ mobile multimedia multicast system comprising a receiver, a transmitter, and a transmission channel, wherein the apparatus comprises a processor adapted to receive a wireless data signal comprising a MediaFLO™ mobile multimedia multicast system superframe comprising WIC and LIC symbols; set a first sparseness index value of the digital signal to zero; set a local copy WIC and LIC number of the digital signal to one; generate a local copy of all possible values of the WIC and LIC symbols corresponding to a WID and LID value from zero to fifteen; divide the received WIC and LIC symbol values by a local copy WIC and LIC value corresponding to WIC and LIC number one; perform an IFFT of the all possible values of the WIC and LIC symbols; calculate a second sparseness index value of the IFFT of sixteen possible values of the WIC and LIC symbols; and extract a WIC and LIC symbol from the digital signal corresponding to the second sparseness index. The processor may be further adapted to confirm that the second sparseness index is greater than the first sparseness index; set the first sparseness index equal to the second sparseness index upon confirmation that the second sparseness index is greater than the first sparseness index; and confirm that the local copy WIC and LIC number equals fifteen.

Additionally, the processor may be further adapted to add one to the local copy WIC and LIC number to generate a new local copy WIC and LIC value when the local copy WIC and LIC number does not equal fifteen; and set the local copy WIC and LIC value equal to the new local copy WIC and LIC value. Moreover, the processor may be further adapted to use the extracted WIC and LIC symbol as an estimate of the transmission channel in a time domain. Preferably, the dividing of the received WIC and LIC symbols by the local copy WIC and LIC value results in an estimate of the transmission channel in a frequency domain. Also, the processor may be further adapted to correct a coarse carrier frequency offset of each of the received WIC and LIC symbols prior to performing the dividing process, wherein all possible values of the WIC and LIC symbols preferably equals sixteen.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need to derive WIC and LIC estimation in MediaFLO™ mobile multimedia multicast systems. The embodiments herein achieve this by providing an efficient technique of WIC and LIC estimation without channel model construction. Referring now to the drawings and more particularly to FIGS. 1A through 8, where similar reference characters denote corresponding features consistently throughout the figures, there are shown preferred embodiments.

FIG. 1A illustrates a channel model which is a phenomena that affects the transmitted information along its path to the receiver. Here, r(t) represents the received data sequence, h(t) represents the channel affect, and x(t) represents the descrambled transmitted data sequence. All functions are real time functions.

Figure 1B:
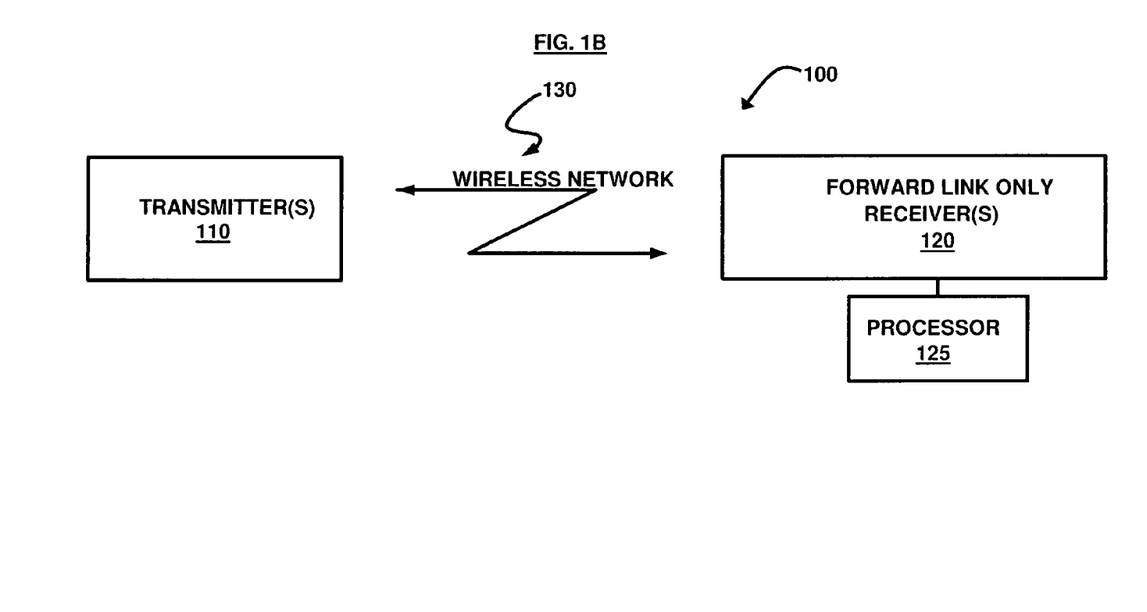
FIG. 1B illustrates a FLO system for a MediaFLO™ system according to an embodiment herein.

The FLO system is comprised of two parts: (a) The FLO network, which includes the collection of transmitters and the backhaul network, and (b) The FLO device, which may be any type of communicating devices such as a cell phone, computer, personal assistant, laptop, handheld, or gaming consoles, etc. FIG. 1B illustrates a FLO system 100 for a MediaFLO™ system. The system 100 includes one or more transmitters 110 that communicate across a wireless network 130 to one or more receivers 120 and a processor 125.

The FLO system 100 is utilized in developing an air interface for the MediaFLO™ mobile multicast system. The air interface uses Orthogonal Frequency Division Multiplexing (OFDM) as the modulation technique, which is also utilized by Digital Audio Broadcasting (DAB), (DVD-T), and (ISDB-T).

To ensure that the user experience is as uniform as possible over the entire coverage area and optimize spectral efficiency and network economics, FLO system 100 employs the concept of Single Frequency Network (SFN) operation.

The FLO system 100 multicasts several services. A service is an aggregation of one or more related data components, such as the video, audio, text or signaling associated with a service. In an embodiment, the services are classified into two types based on their coverage area: Wide-area services and Local-area services. A Local-area service is multicast for reception within a metropolitan area. By contrast, Wide-area services are multicast in one or more metropolitan areas. The term Local-area is used to denote the transmitters within a metropolitan area. The term Wide-area is used to denote transmitters in one or more metropolitan areas that multicast the same Wide-area services. Thus, a Wide-area contains one or more Local-areas, with the transmitters in the different Local-areas multicasting different local area services and in an embodiment, using different radio frequency (RF) center frequencies.

FLO services are carried over one or more logical channels. These logical channels are called Multicast Logical Channels (MLC). An important aspect is that MLCs are distinguishable at the physical layer. For example, the video and audio components of a given service can be sent on two different MLCs. A FLO device (a receiver from the plurality of receivers 120) that is interested in the audio component can only receive the corresponding MLC without receiving the MLC for the video component, thereby saving battery resources.

The statistical multiplexing of different services, or MLCs, is achieved by varying only the MLC time and frequency allocations over prescribed time intervals to match the variability in the MLC's source rates. Statistical multiplexing in FLO enables the receivers 120 to demodulate and decode only the MLC(s) of interest.

The data rates required by the services are expected to vary over a wide range, depending on their multimedia content. Thus, effective use of statistical multiplexing can significantly increase the number of services supported by a multicast system using a specified channel bandwidth.

Figure 2:
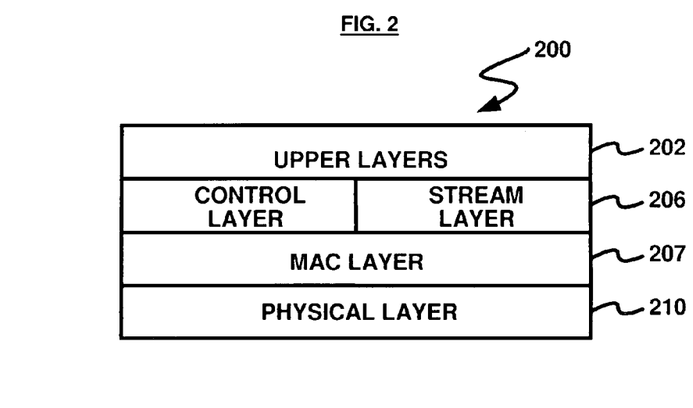
FIG. 2 illustrates a layering architecture for an air interface of a FLO system according to an embodiment herein.

FIG. 2 illustrates a layering architecture 200 for an air interface of a FLO system. The air interface is layered with the interface defined for each layer. The layers are as follows:

The upper layers 202 provide multiple functions including compression of multimedia content, access control to multimedia, and content and formatting of control information. The Medium Access Control (MAC) layer 207 controls access to the physical layer 210, performs the mapping between logical channels and physical channels, multiplexes logical channels for transmission over the physical channel, de-multiplexes the logical channels at the mobile device, and enforces Quality of service (QOS) requirements.

The stream layer (and accompanying control layer) 206 provides binding of the upper layers 202 packets to streams of each logical channels and packetization residual error handling functions. The physical layer 210 provides channel structure for the forward link and defines frequency, modulation, and encoding requirements.

At each transmitter 110 (of FIG. 1B), the transmitted MLCs of the FLO system 100 (of FIG. 1B) are organized as superframes. In an embodiment, a superframe is of one second duration and comprises 1200 OFDM symbols of 0.833 ms duration each. In an embodiment, each superframe comprises 200 OFDM symbols per MHz of allocated bandwidth, as each of the OFDM symbol is of 0.833 ms duration.

Figure 3:
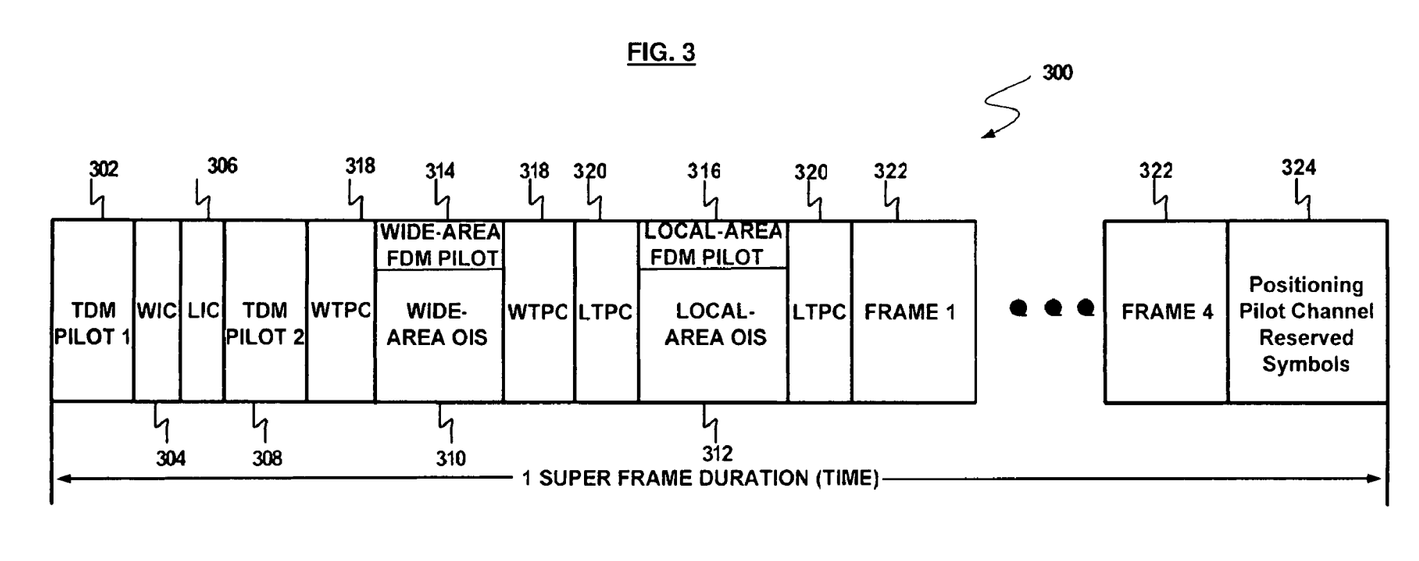
FIG. 3 illustrates a FLO superframe structure for a MediaFLO™ system according to an embodiment herein.

FIG. 3 illustrates a FLO superframe structure 300 for a MediaFLO™ system. The transmission and reception in the FLO system are based on using 4096 (4K) subcarriers. The selection of 4096 subcarriers in FLO provides superior mobile performance compared to 2048 (2K) and 8192 (8K) subcarriers. Of the 4096 subcarriers, 96 are unused and referred to as guard subcarriers. The remaining 4000 subcarriers are referred to as active subcarriers, which are modulated by data or pilot symbols. In an embodiment, these 4000 active subcarriers are further equally divided into eight disjoint groups called interlaces. One interlace from the group is assigned to the Frequency Division Multiplexing (FDM) pilot and is used for channel estimation. The remaining seven interlaces are available for modulation with data symbols. The pilot and data subcarriers are modulated with symbols that have the same energy in the FLO system. These interlaces are allocated to MLC(s) and enable frequency-division multiplexing. Since, the subcarriers within an interlace span the total FLO signal bandwidth there is no loss of frequency diversity.

Forward error correction and coding can also be used to gain the benefit of OFDM over time/frequency-selective channels. In an embodiment, the FLO design uses a concatenated coding scheme, comprising of an outer Reed Solomon (RS) code and an inner Parallel Concatenated Convolution code (PCCC), also called as a turbo code.

As illustrated in FIG. 3, a superframe is divided into Time Division Multiplexed (TDM) pilot OFDM symbols, frequency division multiplexed (FDM) pilot channel with Overhead Information symbols (OIS) channel, Transition Pilot Channels (TPC) symbols 318, 320, data channels 322, and Positioning Pilot Channel (PPC) 324.

There are four TDM pilot OFDM symbols namely TDM pilot 1 (TDM1) 302, Wide-area Identification Channel (WIC) 304, Local-area Identification Channel (LIC) 306, and TDM pilot 2 (TDM2) 308.

The OIS channel is divided into two sections namely the Wide-area OIS channel 310, and Local-area OIS channel 312, each comprising five OFDM symbols that carry overhead information. The Wide-area OIS channel 310 contains information about those MLCs that are common to the wide area, while the Local-area OIS channel 312 contains information about those MLCs that are common to specific local coverage areas.

Similar to the OIS channel, a FDM pilot channel is divided into two sections namely the Wide-area FDM pilot channel 314 and the Local-area FDM pilot channel 316. The TPCs 318, 320 are symbols flanking each continuous portion of the Local-area OIS 312, Wide-area OIS 310, Local-area data frames and Wide-area data frames. The TPC symbols are used to assist channel estimation for demodulation of the data OFDM symbol adjacent to them.

The four data channels 322 occupy a substantial portion of the superframe 300 and carry the multicast multimedia information to the FLO receivers 120 of FIG. 1B. The PPC 324 forms the last portion of a superframe 300 and comprises 2, 6, 10, or 14 OFDM symbols. The PPC symbol is unique for each transmitter 110 of FIG. 1B and in an embodiment, is used for transmitter identification. In an embodiment the PPC is used for position location of the receiving device using triangulation methods.

Generally, the embodiments herein estimate the values of both the WIC and LIC symbols without the channel model construction. This is accomplished based on the sparseness of the channel in the time domain. The WIC and LIC symbols have sixteen possible values corresponding to sixteen possible known values of WID and LID. Accordingly, WIC and LIC symbols can be extracted correctly with no need to wait for channel model construction.

Figure 4A:
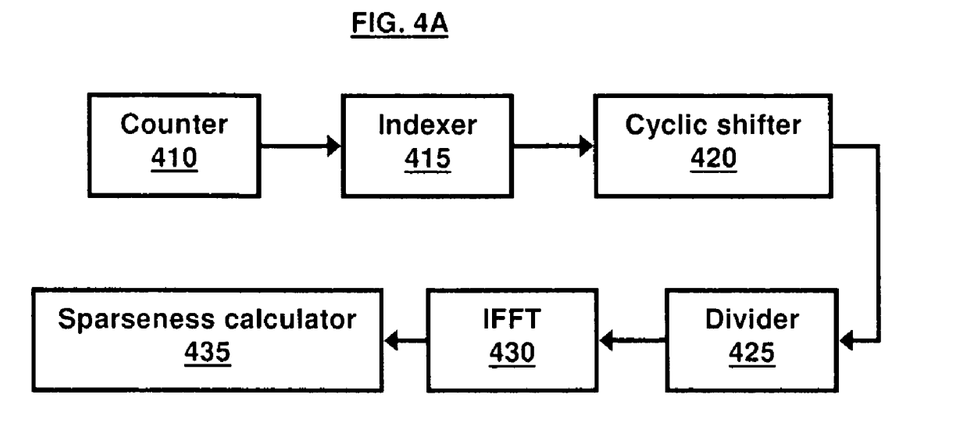
FIG. 4A illustrates a block diagram for a coarse carrier frequency offset estimation process according to an embodiment herein.

First, a coarse carrier frequency estimation process occurs. FIG. 4A illustrates a block diagram for a coarse carrier frequency offset estimation process in accordance with an embodiment. After a TDM pilot 1 location has been determined, the coarse carrier frequency offset is estimated. A counter 410 is used to count the number of times a peak within a chunk is repeated. An indexer 415 is used to get the index of maximum count of the counter 410. The index with the maximum count is declared as a candidate coarse frequency offset. This value is within $\{+/-32n, n= \ldots, -2, -1, 0, 1, 2 \ldots\}$ sub-carriers from the correct coarse frequency offset, since all these possible offsets result in the same pattern within a chunk. The output of the indexer 415 is provided to a cyclic shifter 420, which cyclically shifts the estimated TDM pilot 1 symbol either to the left or the right by +/−32n corresponding to +/− sign of the offset with this value. The resulting symbol from the cyclic shifter 420 is divided by the ideal TDM pilot 1 by a divider 425. For the correct shift, this should result in an estimate of the channel in the frequency domain. From the result of the division a 128-point Inverse Fast Fourier Transform (IFFT) is computed by an IFFT processor 430. For the correct TDM pilot 1, this should be the channel in the time domain which should be very sparse. A sparseness calculator 435 is used to compute the sparseness index. The sparseness index calculation algorithm used in Digital Video Broadcasting-Handheld (DVB-H) may be used to estimate the degree of sparseness of the resulting channel estimate and the offset which results in the most sparse channel estimate is declared as a correct one. The correct coarse frequency offset corresponds to the channel with the highest sparseness.

Figure 4B:
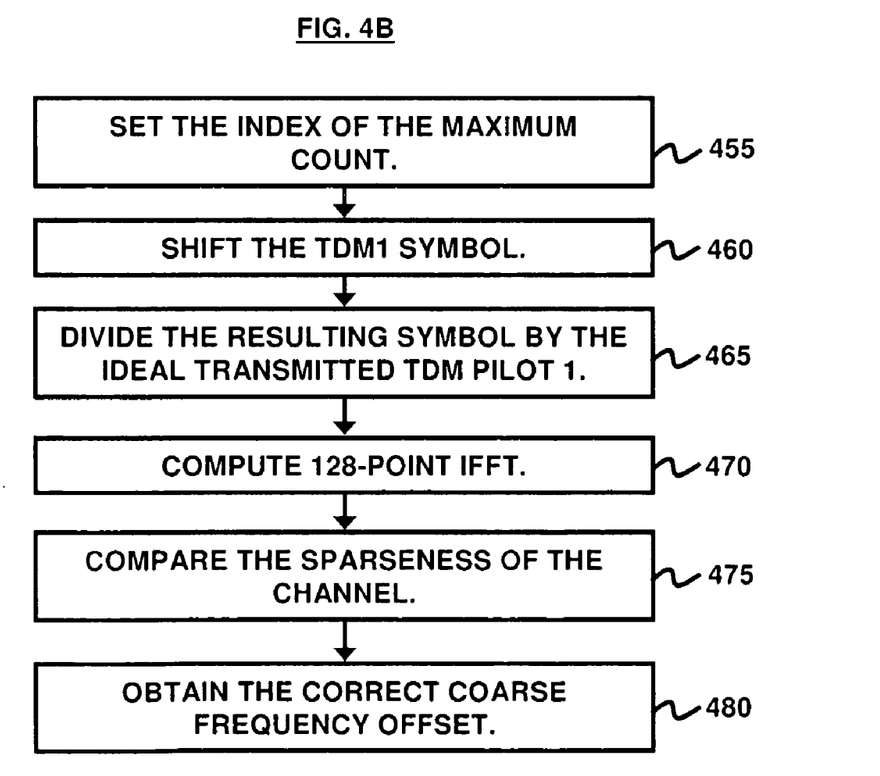
FIG. 4B is a flow diagram illustrating a method for estimating coarse frequency offset in a MediaFLO™ system according to an embodiment herein.

FIG. 4B is a flow diagram illustrating one embodiment of a method for estimating coarse frequency offset in a MediaFLO™ system. At block 455, the number of times a value of a peak is repeated is counted by the counter 410 of FIG. 4A, and an index of the peak with the maximum count is obtained, and the index with the maximum count is set as a candidate coarse frequency offset. Next, at block 460, the estimated TDM pilot 1 symbol is shifted by each possible frequency offset+/−32n for all possible values of n. Next, at block 465, the resulting symbol is divided by the ideal transmitted TDM pilot 1. Moving to block 470, the 128-point IFFT for the resulting symbol after division is computed. At block 475, the sparseness of all the time domain channels for all possible offsets is compared. Next, at block 480, a correct coarse frequency offset corresponding to the highest sparseness channel is obtained.

Figure 5:
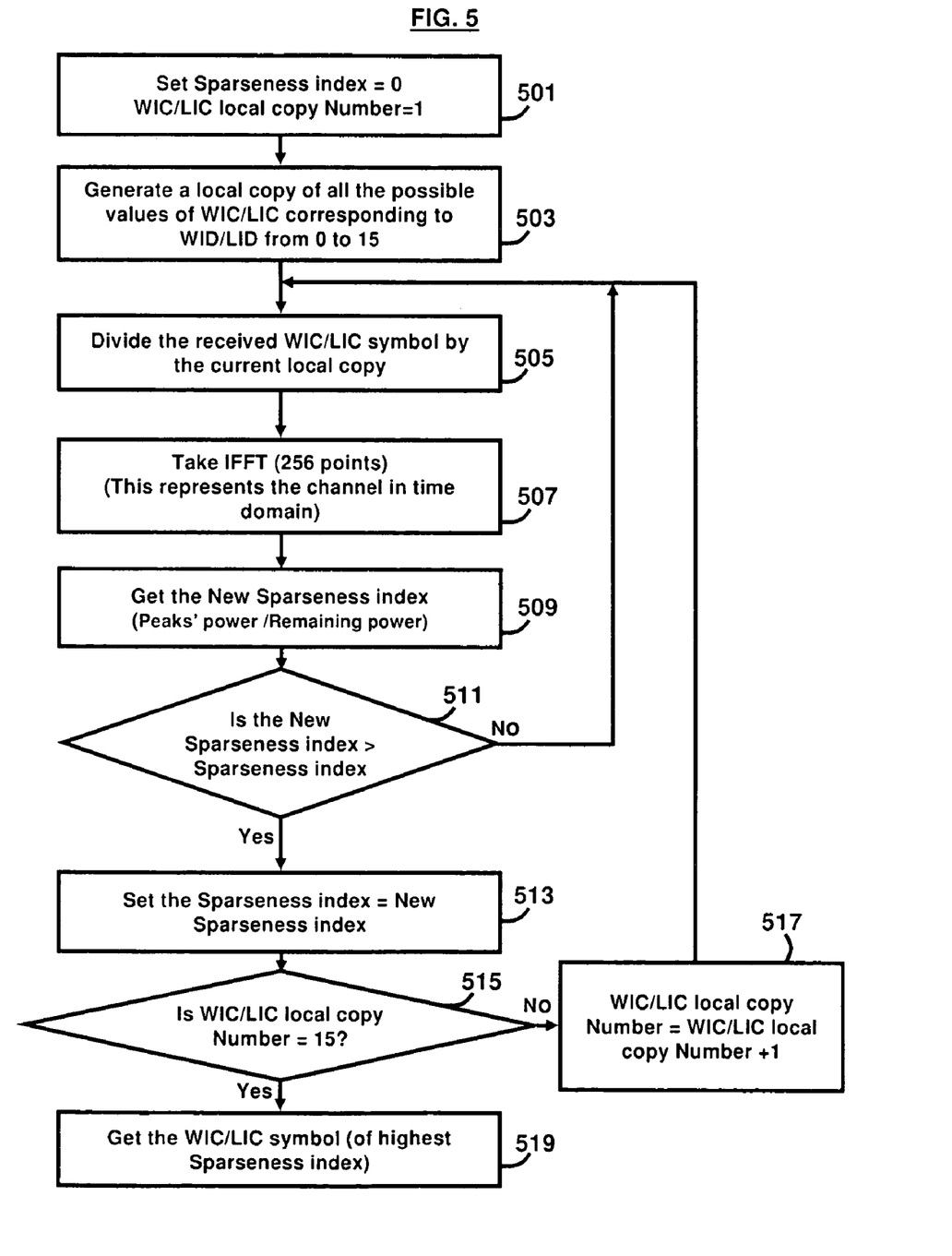
FIG. 5 is a flow diagram illustrating a method of WIC and LIC estimation according to the embodiments herein.

FIG. 5, with reference to FIGS. 1B through 4B, is a flow diagram illustrating the method of WIC and LIC estimation according to the embodiments herein. In the context of the embodiments herein, the "symbol index" is the order number of the symbol within a superframe; i.e., any number from 1 to 1200. The "index search space" is a defined range of indices representing the deviation from the expected index. The "sparseness index" is the ratio of the peaks' power to the remaining power of a signal. For either the WIC or the LIC, the following process occurs: First, the sparseness index is set (501) equal to 0 and the WIC/LIC local copy number is set equal to 1. Next, for all the possible values of the WID/LID from 0 to 15, a local copy of the WIC/LIC is generated 503 at the receiver 120. Then, the received WIC/LIC is divided (505) by the locally generated copy. For the correct WIC/LIC, this should result in an estimate of the channel in the frequency domain. This requires any coarse frequency offset component to be corrected before doing this division procedure. Upon completion of this step, the 256-point IFFT is calculated (507) for the result of step (505), which results in an estimate of the channel in the time domain which are sparse. The other non-correct values for the WIC/LIC result in a noise-like pattern which is not sparse. In the embodiments herein, each symbol is divided into 125 chunks of 32 carriers each and the location of the peak and its value within a chunk are determined for each chunk. Thereafter, the new sparseness index is calculated (509), which is the ratio of the peaks' power divided by the remaining power in the signal. At decision block (511), it is determined whether the new sparseness index generated at step (509) is greater than the sparseness index established in step (501). If it is not greater (No), then, the process reverts to step (505). If it is greater (Yes), then the sparseness index is set (513) equal to the new sparseness index. After this, at decision block (515), it is determined whether the WIC/LIC local copy number equals 15. If it does (Yes), then the WIC/LIC symbol of the highest sparseness index is used (519). If it does not equal 15 (No), then, the WIC/LIC local copy number is set (517) equal to the WIC/LIC local copy number plus 1 and the process reverts back to step (505).

Figure 6A:
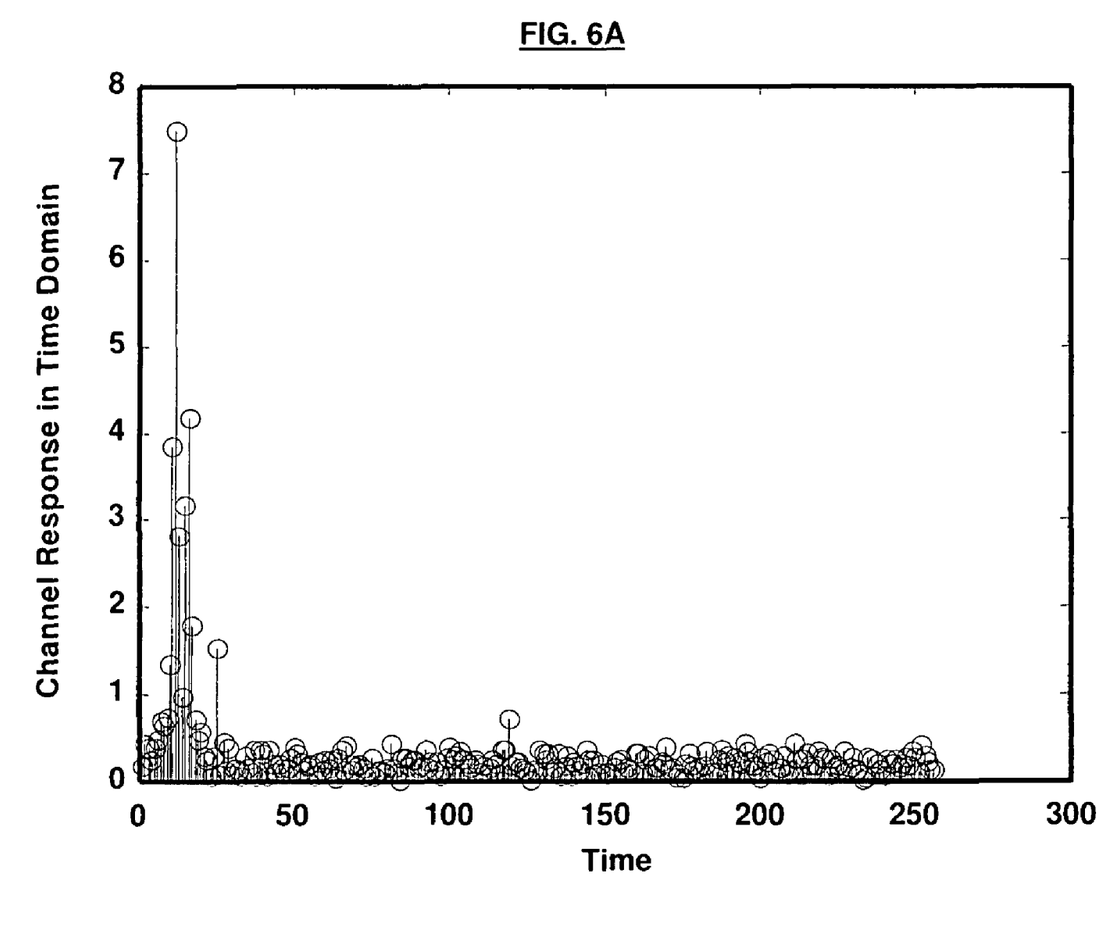
FIG. 6A is a graphical representation illustrating an example of time domain estimation for correct WIC estimation.
Figure 6B:
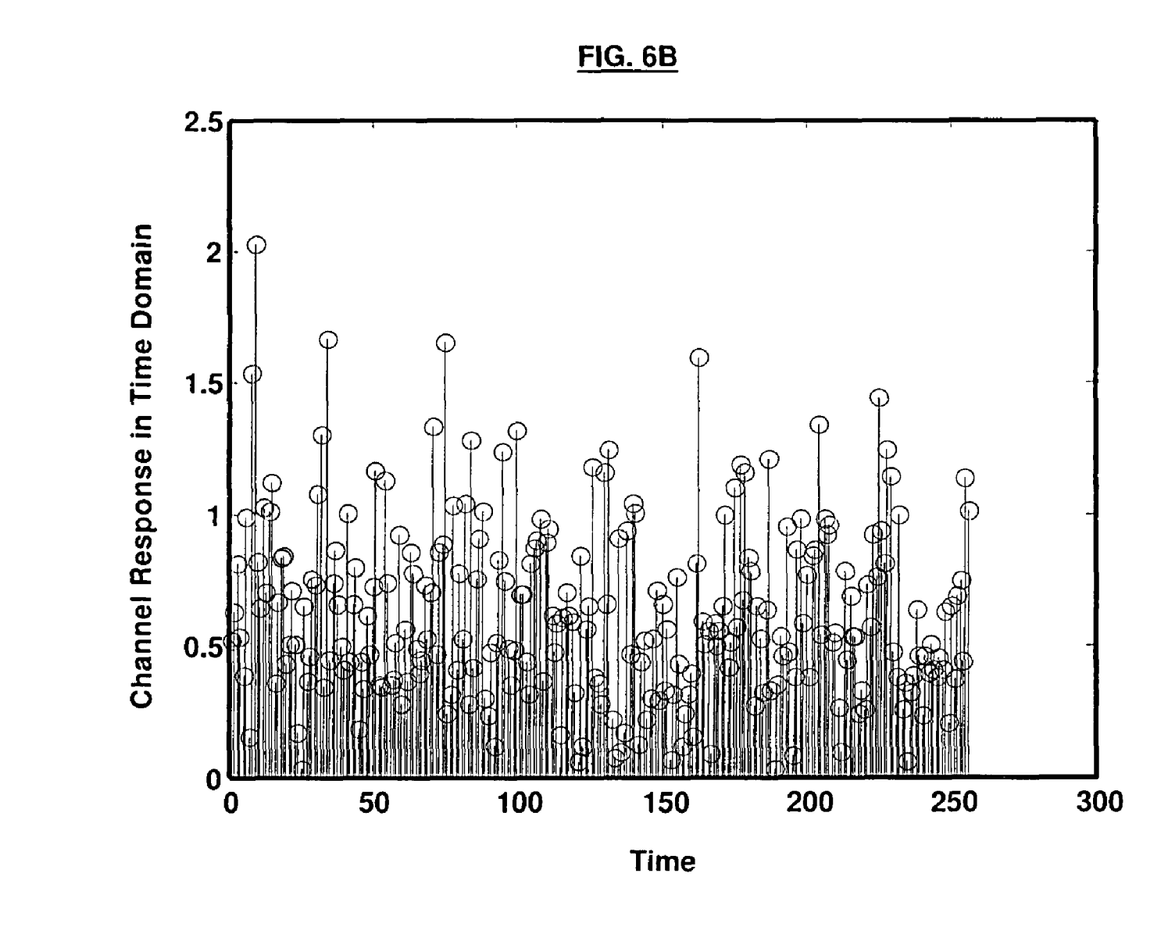
FIG. 6B is a graphical representation illustrating an example of time domain estimation for incorrect WIC estimation.
Figure 7:
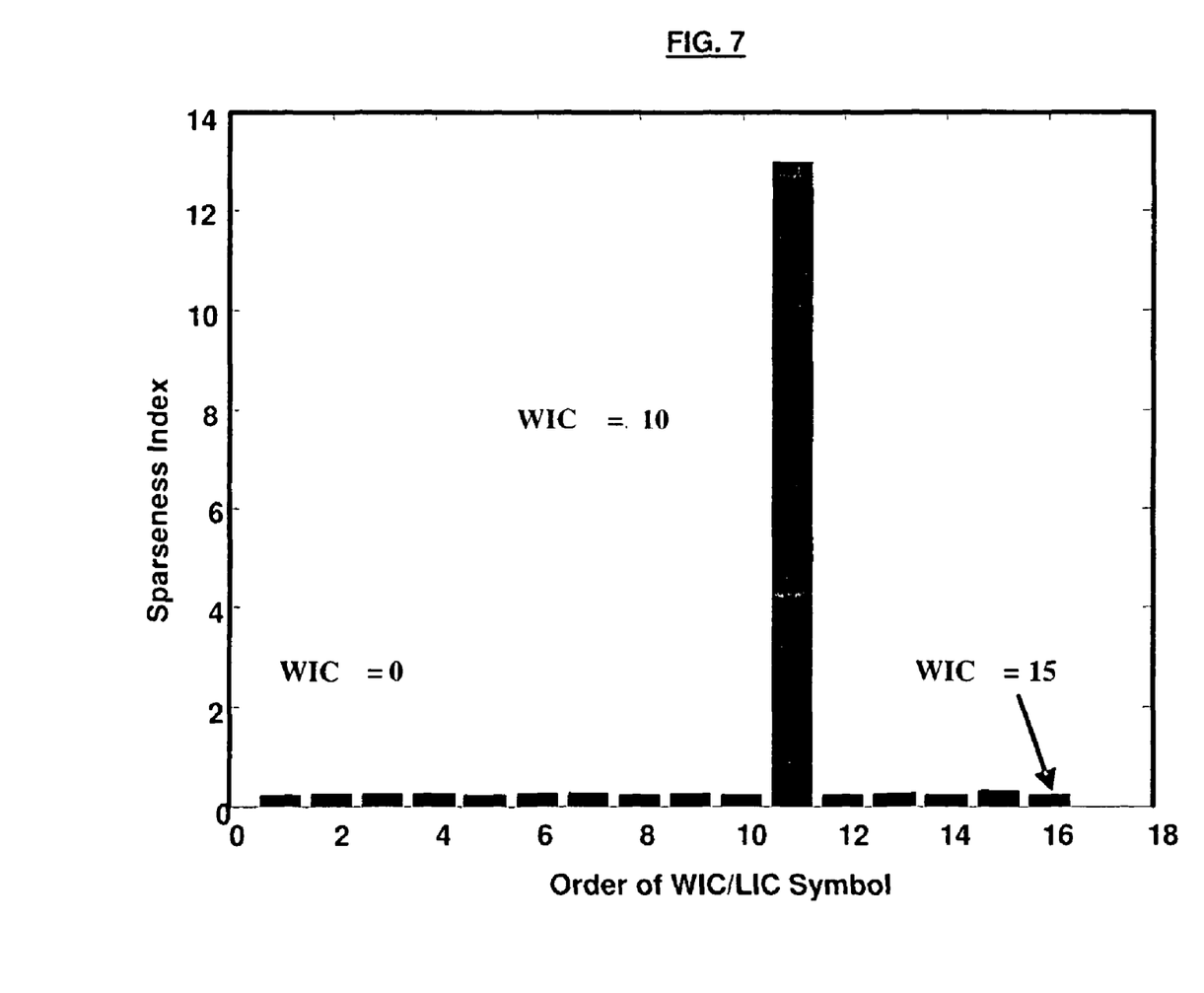
FIG. 7 is a graphical representation illustrating an example of the sparseness index for the time-domain channel estimation for all the possible values of the WIC showing that the maximum sparseness occurs at the correct value of the WIC.

FIG. 6A shows the result of the 256-IFFT process for the division by the correct estimation of WIC. FIG. 6B shows the result of the 256-IFFT process for the division by the incorrect estimation of WIC. It is assumed in FIGS. 6A and 6B that the WID value is 10. For the incorrect value of the WID (FIG. 6B), the result of the division is noise-like, while in the correct estimate of the WID (FIG. 6A) the result is sparse. FIG. 7 further illustrates the difference in the degree of sparseness of the two results of FIGS. 6A and 6B, and more particularly, FIG. 7 is an illustration of an example of sparseness index in which it is assumed that the WID value 10 provides the highest sparseness index.

Figure 8:
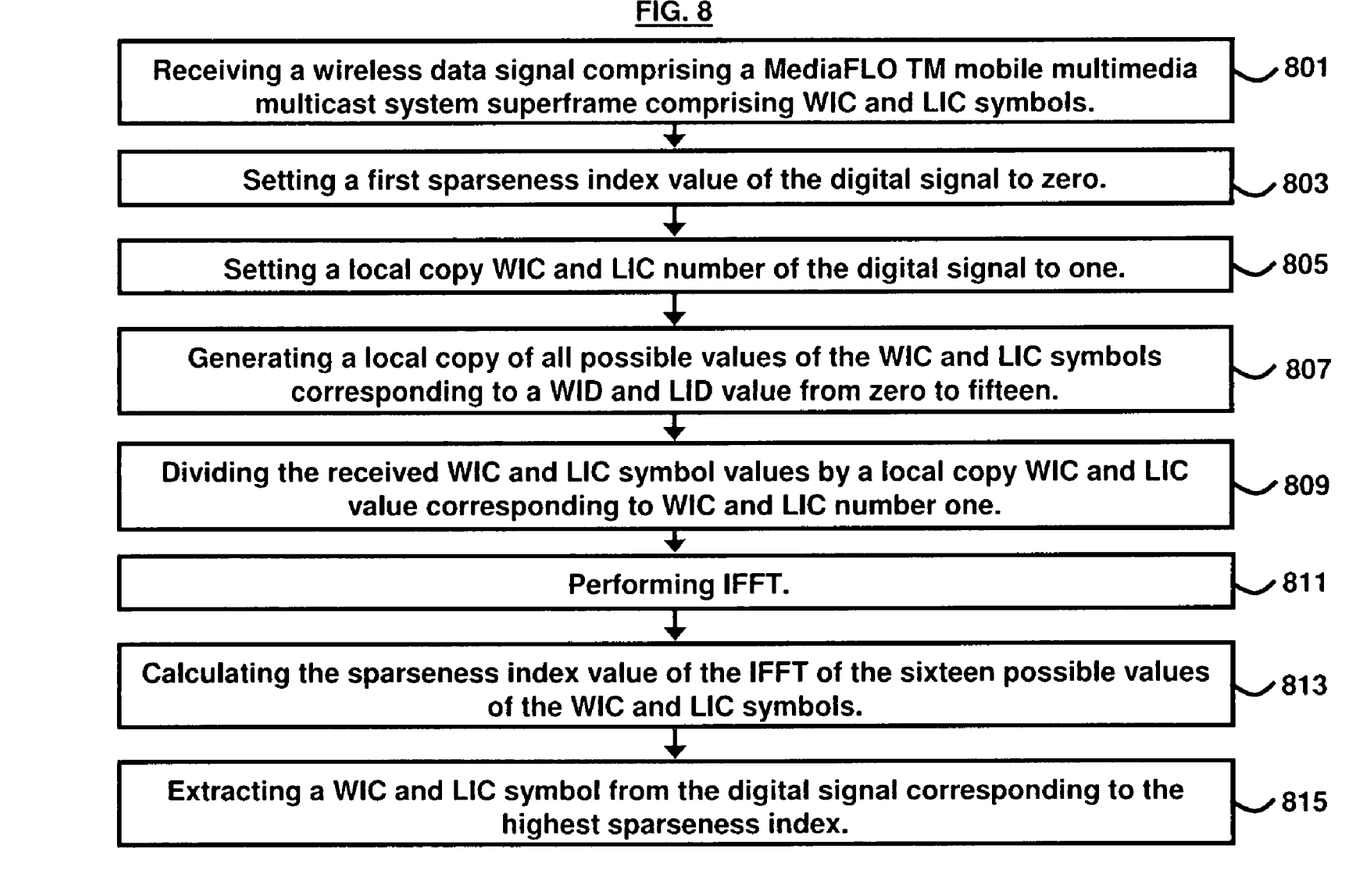
FIG. 8 is a flow diagram illustrating a preferred method according to an embodiment herein.

FIG. 8, with reference to FIGS. 1 through 7, is a flow diagram illustrating a method of estimating a WIC and a LIC in a MediaFLO™ mobile multimedia multicast system 100 comprising a receiver 120, a transmitter 110, and a transmission channel 130, wherein the method comprises receiving (801) a wireless data signal comprising a MediaFLO™ mobile multimedia multicast system superframe 300 comprising WIC and LIC symbols; setting (803) a first sparseness index value of the digital signal to zero; setting (805) a local copy WIC and LIC number of the digital signal to one; generating (807) a local copy of all possible values of the WIC and LIC symbols corresponding to a WID and LID value from zero to fifteen; dividing (809) the received WIC and LIC symbol values by a local copy WIC and LIC value corresponding to WIC and LIC number one; performing (811) an IFFT of the all possible values of the WIC and LIC symbols; calculating (813) a second sparseness index value of the IFFT of sixteen possible values of the WIC and LIC symbols; and extracting (815) a WIC and LIC symbol from the digital signal corresponding to the second sparseness index.

The method may further comprise confirming that the second sparseness index is greater than the first sparseness index; setting the first sparseness index equal to the second sparseness index upon confirmation that the second sparseness index is greater than the first sparseness index; and confirming that the local copy WIC and LIC number equals fifteen. Additionally, the method may further comprise adding one to the local copy WIC and LIC number to generate a new local copy WIC and LIC value when the local copy WIC and LIC number does not equal fifteen; and setting the local copy WIC and LIC value equal to the new local copy WIC and LIC value.

Also, the method may further comprise using the extracted WIC and LIC symbol as an estimate of the transmission channel in a time domain. Moreover, the dividing of the received WIC and LIC symbols by the local copy WIC and LIC value preferably results in an estimate of the transmission channel in a frequency domain. Furthermore, all possible values of the WIC and LIC symbols preferably equals sixteen. The method may further comprise correcting a coarse carrier frequency offset of each of the received WIC and LIC symbols prior to performing the dividing process.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multi chip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
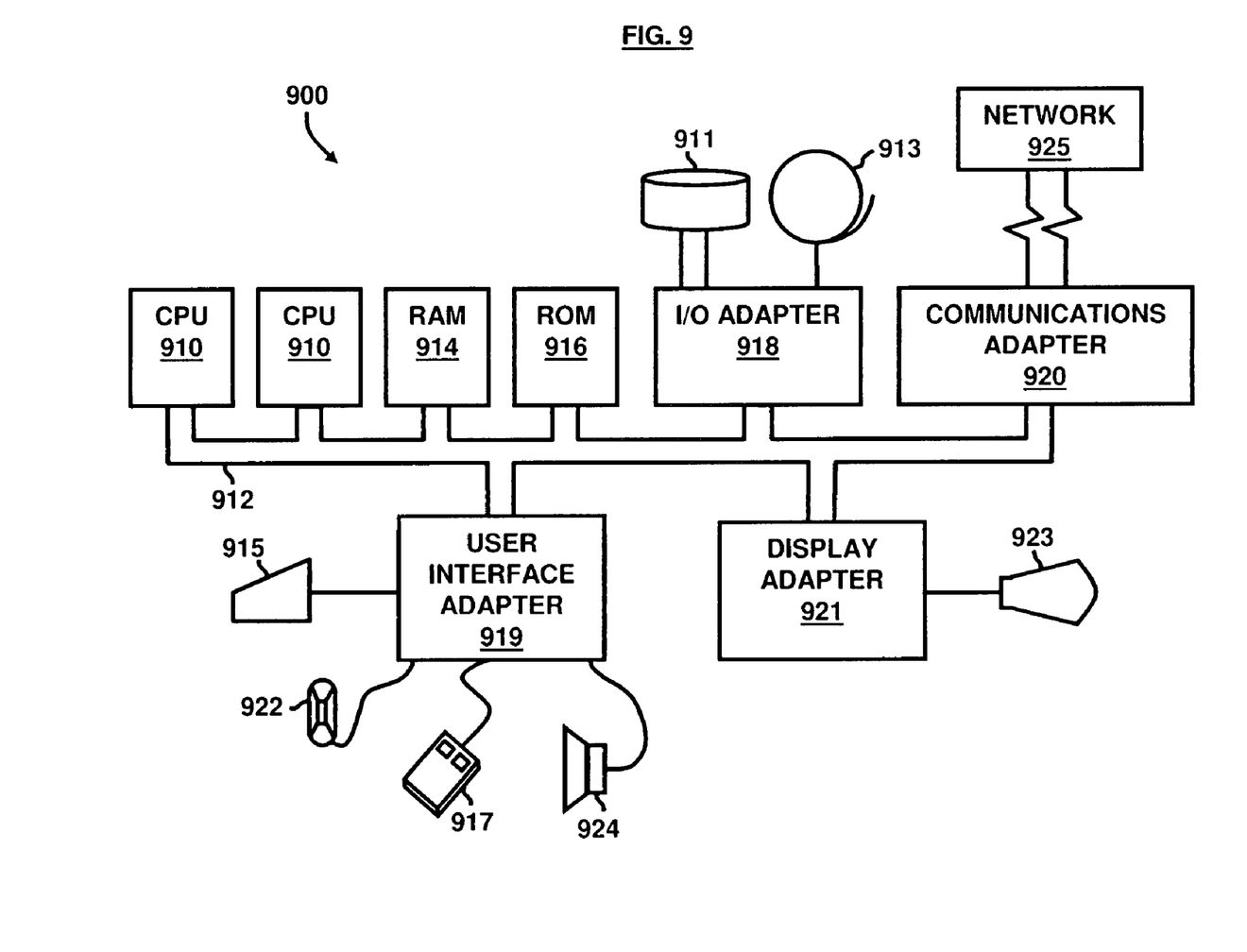
FIG. 9 illustrates a schematic diagram of a computer architecture used in accordance with the embodiments herein.

A representative hardware environment for practicing the embodiments herein is depicted in FIG. 9. This schematic drawing illustrates a hardware configuration of an information handling/computer system 900 in accordance with the embodiments herein. The system 900 comprises at least one processor or central processing unit (CPU) 910. The CPUs 910 are interconnected via system bus 912 to various devices such as a random access memory (RAM) 914, read-only memory (ROM) 916, and an input/output (I/O) adapter 918. The I/O adapter 918 can connect to peripheral devices, such as disk units 911 and tape drives 913, or other program storage devices that are readable by the system 900. The system 900 can read the inventive instructions on the program storage devices and follow these instructions to execute the methodology of the embodiments herein. The system 900 further includes a user interface adapter 919 that connects a keyboard 915, mouse 917, speaker 924, microphone 922, and/or other user interface devices such as a touch screen device (not shown) to the bus 912 to gather user input. Additionally, a communication adapter 920 connects the bus 912 to a data processing network 925, and a display adapter 921 connects the bus 912 to a display device 923 which may be embodied as an output device such as a monitor, printer, or transmitter, for example.

The embodiments herein provide a technique for estimating WIC and LIC symbols without channel mode construction. The embodiments herein reduce the time consumed to synchronize the receiver and consume less battery in synchronizing the received data streams. The embodiments herein further improve the quality of the received data as it does not depend on channel mode construction for descrambling the received data stream.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of estimating a Wide-area Identification Channel (WIC) and a Local-area Identification Channel (LIC) in a MediaFLO™ (Forward Link Only) mobile multimedia multicast system comprising a receiver, a transmitter, and a transmission channel, said method comprising:

receiving a wireless data signal comprising a MediaFLO™ mobile multimedia multicast system superframe comprising WIC and LIC symbols;

setting a first sparseness index value of said digital signal to zero;

setting a local copy WIC and LIC number of said digital signal to one;

generating a local copy of all possible values of said WIC and LIC symbols corresponding to a Wide-area Differentiator (WID) and Local-area Differentiator (LID) value from zero to fifteen;

dividing the received WIC and LIC symbol values by a local copy WIC and LIC value corresponding to WIC and LIC number one;

performing an Inverse Fast Fourier Transform (IFFT) of all said possible values of said WIC and LIC symbols;

calculating a second sparseness index value of the IFFT of sixteen possible values of said WIC and LIC symbols; and extracting a WIC and LIC symbol from said digital signal corresponding to said second sparseness index.

2. The method of claim 1, further comprising:

confirming that said second sparseness index is greater than said first sparseness index;

setting said first sparseness index equal to said second sparseness index upon confirmation that said second sparseness index is greater than said first sparseness index; and confirming that said local copy WIC and LIC number equals fifteen.

3. The method of claim 2, further comprising:

adding one to said local copy WIC and LIC number to generate a new local copy WIC and LIC value when said local copy WIC and LIC number does not equal fifteen; and setting said local copy WIC and LIC value equal to said new local copy WIC and LIC value.

4. The method of claim 1, further comprising using the extracted WIC and LIC symbol as an estimate of said transmission channel in a time domain.

5. The method of claim 1, wherein said dividing of the received WIC and LIC symbols by said local copy WIC and LIC value results in an estimate of said transmission channel in a frequency domain.

6. The method of claim 1, wherein said all possible values of said WIC and LIC symbols equals sixteen.

7. The method of claim 1, further comprising correcting a coarse carrier frequency offset of each of the received WIC and LIC symbols prior to performing the dividing process.

8. A non-transitory program storage device readable by computer, tangibly embodying a program of instructions executable by said computer to perform a method of estimating a Wide-area Identification Channel (WIC) and a Local-area Identification Channel (LIC) in a MediaFLO™ (Forward Link Only) mobile multimedia multicast system comprising a receiver, a transmitter, and a transmission channel, said method comprising:

receiving a wireless data signal comprising a MediaFLO mobile multimedia multicast system superframe comprising WIC and LIC symbols;

setting a first sparseness index value of said digital signal to zero; setting a local copy WIC and LIC number of said digital signal to one; generating a local copy of all possible values of said WIC and LIC symbols corresponding to a Wide-area Differentiator (WID) and Local-area Differentiator (LID) value from zero to fifteen;

dividing the received WIC and LIC symbol values by a local copy WIC and LIC value corresponding to WIC and LIC number one;

performing an Inverse Fast Fourier Transform (IFFT) of all said possible values of said WIC and LIC symbols;

calculating a second sparseness index value of the IFFT of sixteen possible values of said WIC and LIC symbols; and extracting a WIC and LIC symbol from said digital signal corresponding to said second sparseness index.

9. The program storage device of claim 8, wherein said method further comprises:

confirming that said second sparseness index is greater than said first sparseness index;

setting said first sparseness index equal to said second sparseness index upon confirmation that said second sparseness index is greater than said first sparseness index; and confirming that said local copy WIC and LIC number equals fifteen.

10. The program storage device of claim 9, wherein said method further comprises:

adding one to said local copy WIC and LIC number to generate a new local copy WIC and LIC value when said local copy WIC and LIC number does not equal fifteen; and setting said local copy WIC and LIC value equal to said new local copy WIC and LIC value.

11. The program storage device of claim 8, wherein said method further comprises using the extracted WIC and LIC symbol as an estimate of said transmission channel in a time domain.

12. The program storage device of claim 8, wherein said dividing of the received WIC and LIC symbols by said local copy WIC and LIC value results in an estimate of said transmission channel in a frequency domain.

13. The program storage device of claim 8, wherein said all possible values of said WIC and LIC symbols equals sixteen.

14. The program storage device of claim 8, wherein said method further comprises correcting a coarse carrier frequency offset of each of the received WIC and LIC symbols prior to performing the dividing process.

15. An apparatus for estimating a Wide-area Identification Channel (WIC) and a Local-area Identification Channel (LIC) in a MediaFLO™ (Forward Link Only) mobile multimedia multicast system comprising a receiver, a transmitter, and a transmission channel, said apparatus comprising a processor adapted to:

receive a wireless data signal comprising a MediaFLO™ mobile multimedia multicast system superframe comprising WIC and LIC symbols;

set a first sparseness index value of said digital signal to zero;

set a local copy WIC and LIC number of said digital signal to one;

generate a local copy of all possible values of said WIC and LIC symbols corresponding to a Wide-area Differentiator (WID) and Local-area Differentiator (LID) value from zero to fifteen;

divide the received WIC and LIC symbol values by a local copy WIC and LIC value corresponding to WIC and LIC number one;

perform an Inverse Fast Fourier Transform (IFFT) of all said possible values of said WIC and LIC symbols;

calculate a second sparseness index value of the IFFT of sixteen possible values of said WIC and LIC symbols; and extract a WIC and LIC symbol from said digital signal corresponding to said second sparseness index.

16. The apparatus of claim 15, wherein said processor is further adapted to:

confirm that said second sparseness index is greater than said first sparseness index;

set said first sparseness index equal to said second sparseness index upon confirmation that said second sparseness index is greater than said first sparseness index; and confirm that said local copy WIC and LIC number equals fifteen.

17. The apparatus of claim 16, wherein said processor is further adapted to:

add one to said local copy WIC and LIC number to generate a new local copy WIC and LIC value when said local copy WIC and LIC number does not equal fifteen; and set said local copy WIC and LIC value equal to said new local copy WIC and LIC value.

18. The apparatus of claim 15, wherein said processor is further adapted to use the extracted WIC and LIC symbol as an estimate of said transmission channel in a time domain.

19. The apparatus of claim 15, wherein the dividing of the received WIC and LIC symbols by said local copy WIC and LIC value results in an estimate of said transmission channel in a frequency domain.

20. The apparatus of claim 15, wherein said processor is further adapted to correct a coarse carrier frequency offset of each of the received WIC and LIC symbols prior to performing the dividing process, wherein said all possible values of said WIC and LIC symbols equals sixteen.

* * * * *